United States Patent [19]

Kim et al.

[11] Patent Number: 5,239,000
[45] Date of Patent: Aug. 24, 1993

[54] THERMOPLASTIC ELASTOMER AND PROCESS FOR PREPARATION

[75] Inventors: Myung H. Kim, Cheshire; Byung H. Lee, Easton, both of Conn.

[73] Assignee: Yukong Limited, Seoul, Rep. of Korea

[21] Appl. No.: 719,254

[22] Filed: Jun. 21, 1991

[51] Int. Cl.⁵ .............. C08L 23/26; C08L 23/16; C08L 23/10; C08L 23/04

[52] U.S. Cl. .................. 525/133; 525/193; 525/194; 525/197; 525/198; 525/240

[58] Field of Search ............. 525/193, 194, 198, 197, 525/133; 524/490

[56] References Cited

U.S. PATENT DOCUMENTS

| | | | |
|---|---|---|---|
| 3,884,993 | 5/1975 | Gras | 525/197 |
| 4,311,628 | 1/1982 | Sabet et al. | 260/33.6 |
| 4,678,834 | 7/1987 | Boivin et al. | 525/193 |
| 4,737,547 | 4/1988 | White | 525/240 |
| 4,960,829 | 10/1990 | Allen et al. | 525/193 |

FOREIGN PATENT DOCUMENTS 57-063343 4/1982 Japan.

*Primary Examiner*—Carman J. Seccuro, Jr.
*Attorney, Agent, or Firm*—John H. Crozier

[57] ABSTRACT

Thermoplastic elastomers in which low molecular weight ethylene/propylene/nonconjugated diene rubber ("liquid" EPDM rubber) replaces part of the high molecular weight EPDM rubber used in conventional blends exhibit better tension set properties than conventional blends in which liquid EPDM rubber is not used. A masterbatch containing liquid EPDM rubber and phenolic curing resin which is added to a mixture of polyolefin, high molecular weight EPDM rubber, and other ingredients during mixing results in a thermoplastic elastomer having better mechanical properties as well as better tension set properties than blends of conventional materials.

8 Claims, No Drawings

THERMOPLASTIC ELASTOMER AND PROCESS FOR PREPARATION

BACKGROUND OF THE INVENTION

1. Field of the Invention

The present invention relates to elastomers generally and, more particularly, but not by way of limitation, to a novel process for producing a thermoplastic elastomer having improved physical properties.

2. Background Art

Previously known processes to produce thermoplastic elastomers have involved dynamically vulcanizing a mixture of polyolefin and high molecular weight EPDM rubber. Such processes are described, for example, in U.S. Pat. No. 4,130,535, issued Dec. 19, 1978, to Coran et al, and U.S. Pat. No. 4,311,628, issued Jan. 19, 1982, to Abdou-Sabet et al. The general process is to mix the polyolefin and EPDM rubber at temperatures sufficient to soften or melt the polyolefin and then to add a curative which is preferably a phenolic curing resin A cure accelerator is added and mixing is continued until curing is complete. Mixing equipment employed may be any conventional masticating equipment, such as Banbury mixers, Brabender mixers, or certain mixing extruders. The thermoplastic elastomers thus produced exhibit relatively good oil resistance and physical properties compared to partially vulcanized and sulfur or peroxide cured compositions.

Although the above processes produce improved thermoplastic elastomers, the physical properties thereof are still somewhat deficient, due, primarily to the poor distribution of phenolic curing resin during the mixing/curing step. Distribution of phenolic curing resin in the blends of EPDM rubbers and polyolefin resin during dynamic vulcanization affects the final properties. Therefore, thorough dispersal of the curing resin before the cure accelerator is added is necessary to have highly desirable characteristics. However, since the phenolic resins have low melting temperatures and very low viscosities after melting, they are difficult to distribute into the highly viscous rubber matrix, in the short time available, to prevent any unwanted reaction such as self-polymerization. Accordingly, an improved method of distributing phenolic curing resin in the blends is needed to improve elastic properties as well as improved mechanical properties.

Accordingly, it is a principal object of the present invention to provide a method for producing thermoplastic elastomers which provides for improved distribution of phenolic curing resin in mixtures of polyolefin and high molecular weight EPDM rubber.

Other objects of the present invention, as well as particular features, elements, and advantages thereof, will be elucidated in, or be apparent from, the following description.

SUMMARY OF THE INVENTION

It has been discovered that thermoplastic elastomer compositions in which low molecular weight ethylene/propylene/nonconjugated diene rubber ("liquid" EPDM rubber) replaces part of the high molecular weight EPDM rubber used in otherwise conventional blends exhibit better tension set properties than conventional blends in which liquid EPDM rubber is not used. Furthermore, it has been discovered also that a masterbatch containing liquid EPDM rubber and phenolic curing resin which is added to a mixture of polyolefin, high molecular weight EPDM rubber, and other ingredients during mixing results in a thermoplastic elastomer exhibiting better mechanical properties as well as better tension set properties than blends of conventional materials. Tension set is an important measure of elasticity.

Because of its liquid state even at room temperature, due to the low molecular weight of liquid EPDM rubber, the phenolic curing resin can be readily mixed with liquid EPDM rubber at a temperature above the melting point of the curing resin but lower than the activation temperature of the resin. The resulting "masterbatch" once made has certain advantages, such as easy handling and also precise feeding of phenolic curing resin in the compositions which results in consistent product quality.

DESCRIPTION OF THE PREFERRED EMBODIMENTS

Generally, the final compositions of the thermoplastic elastomer produced by the present invention in terms of total EPDM rubber are conventional and may comprise a blend of about 14-80 parts by weight of high molecular weight EPDM rubber per 100 parts by weight of polyolefin resin and total final rubber content and about 1-30 parts by weight of liquid EPDM rubber per 100 parts by weight of polyolefin resin and total final rubber content and about 85-15 parts by weight of thermoplastic crystalline polyolefin resin per 100 parts by weight of polyolefin resin and total final rubber content. The invention is especially advantageous for preparing compositions comprising 23-70 parts by weight of high molecular weight EPDM rubber per 100 parts by weight of polypropylene resin and total final rubber content, 2-15 parts by weight of liquid EPDM rubber per 100 parts by weight of polypropylene resin and total final rubber content, and 75-20 parts by weight of polypropylene resin per 100 parts by weight of polypropylene resin and total final rubber content.

The thermoplastic elastomer compositions of the invention may be prepared by blending a mixture of high molecular weight EPDM rubber, liquid EPDM rubber, softened or molten polyolefin resin, and a masterbatch containing phenolic curing resin and liquid EPDM rubber at a temperature which is high enough to maintain the molten mixture and promote curing by dynamic vulcanization using conventional mixing equipment such as Banbury mixer, Brabender mixer, or various kinds of extruders. The mixing is continued until the curing is completed.

Table I below is presented to illustrate comparative physical properties and is not intended to be a limitation on the full range of compositions of EPDM/polyolefin thermoplastic elastomers, the invention being applicable to the full range of known compositions set forth above.

The thermoplastic elastomer compositions comprising high molecular weight EPDM rubber, polypropylene, and liquid EPDM rubber were prepared by dynamic vulcanization. The compositions of the elastomers and measured properties thereof are set forth in Table 1.

A Brabender mixer was used for mixing the components at 80 rpm rotor speed with a set temperature of 180 degrees Centigrade.

To prepare the compositions (except Stocks 3, 6 and 9), high molecular weight EPDM rubber and liquid EPDM rubber (if used) were first mixed for two minutes, then polypropylene was added and mixing was continued for four additional minutes. Phenolic curing resin was then added and mixing continued for an additional one minute. Then, zinc oxide as a cure accelerator was added and mixing was continued for five additional minutes, at the end of which time curing was completed.

To prepare Stocks 3, 6 and 9, which used a masterbatch containing liquid EPDM and phenolic curing resin, high molecular weight EPDM rubber and liquid EPDM rubber were first mixed for two minutes, then polypropylene was added and mixing continued for an additional four minutes. The masterbatch containing liquid EPDM rubber and phenolic curing resin was then added and mixing continued for an additional one minute. Then, zinc oxide was added and mixing was continued for five additional minutes, at the end of which time curing was completed.

Samples of the cured stocks were compression molded at 210 degrees Centigrade and then cooled to room temperature under pressure before removal.

Stocks 1, 4 and 7 are controls containing no liquid EPDM rubber. Stocks 2, 5 and 8 are compositions containing liquid EPDM rubber, but do not use masterbatch. It is clear that the use of liquid EPDM rubber improves tension set despite the slight decrease of other physical properties. Liquid EPDM rubber improved tension set regardless of the ratio of PP/EPDM.

Stocks 3, 6 and 9, which used masterbatch containing liquid EPDM rubber and phenolic curing resin, also clearly show that not only tension set but also other physical properties are improved.

The masterbatch used comprised 40 weight percent liquid EPDM rubber and 60 weight percent phenolic curing resin and was prepared by mixing with low heat.

Sufficient liquid EPDM rubber must be added to provide a fairly viscous mixture, while still maintaining a relatively high concentration of phenolic curing resin. The preferred range of liquid EPDM rubber concentrations is from about 20 to about 60 weight percent.

While liquid EPDM rubber having a molecular weight of 8,000 was used in the examples, a satisfactory range of molecular weights for the liquid EPDM rubber is from about 500 to about 20,000.

Mixing torque before completion of mixing was also measured. The final torque data indicate that addition of liquid EPDM rubber reduces shear viscosity as well as mixing energy.

All physical properties were measured according to standard ASTM procedures.

The properties of the thermoplastic elastomers produced by the present invention may be modified by adding other ingredients which are conventional in the compounding of EPDM rubber. Such ingredients include particulate fillers, clays, colored pigment, zinc oxide, stearic acid, reinforcing agent, stabilizers, antioxidants, flame retardants, processing aids, tackifiers, plasticizers, wax, and extender oils.

The liquid EPDM used was Trilene furnished by Uniroyal Chemical Company, Naugatuck, Conn. The polyolefin used was polypropylene furnish by Himont of Italy under the name Profax. The phenolic curing resin used was SP-1055 furnished by Schenectady Chemical Company, Schenectady, N.Y.

It will thus be seen that the objects set forth above, among those elucidated in, or made apparent from, the preceding description, are efficiently attained. It will be understood that the above specific examples are intended to be illustrative only and that the invention is not limited to the specific conditions, materials, or concentrations given therein, but encompasses the full range of effective conditions and concentrations which may be used in practicing the invention.

It is also to be understood that the following claims are intended to cover all of the generic and specific features of the invention herein described and all statements of the scope of the invention which, as a matter of language, might be said to fall therebetween.

TABLE I

| Stocks | 1 | 2 | 3 | 4 | 5 | 6 | 7 | 8 (part by wt) | 9 |
|---|---|---|---|---|---|---|---|---|---|
| EPDM[1] | 60 | 54 | 54 | 50 | 45 | 45 | 40 | 36 | 36 |
| L-EPDM[2] | — | 6 | 1.5 | — | 5 | 1.2 | — | 4 | 1 |
| PP[3] | 40 | 40 | 40 | 50 | 50 | 50 | 60 | 60 | 60 |
| SP-1055[4] | 6.8 | 6.8 | — | 5.6 | 5.6 | — | 4.5 | 4.5 | — |
| M[5] | — | — | 11.3 | — | — | 9.4 | — | — | 7.5 |
| Zinc Oxide | 1.3 | 1.3 | 1.3 | 1.1 | 1.1 | 1.1 | 0.9 | 0.9 | 0.9 |
| UTS, psi | 3662 | 3515 | 3773 | 3930 | 3580 | 3960 | 4220 | 4020 | 4280 |
| Ult. Elong., % | 399 | 389 | 399 | 430 | 430 | 420 | 490 | 500 | 460 |
| Tens. Set, % | 20 | 15 | 20 | 35 | 25 | 25 | 50 | 40 | 32 |
| Hardness | | | | | | | | | |
| Shore A | 87 | 92 | 91 | 96 | 94 | 86 | 93 | 95 | 90 |
| Shore D | 44 | 38 | 39 | 40 | 45 | 40 | 50 | 47 | 45 |
| Stress at | | | | | | | | | |
| 100% Elong., | 1220 | 1202 | 1298 | 1440 | 1350 | 1493 | 1740 | 1810 | 1817 |
| 300% Elong., psi | 2340 | 2344 | 2560 | 2233 | 2140 | 2417 | 2280 | 2273 | 2347 |
| Final Torque, m.g | 3050 | 2890 | 2950 | 2680 | 2550 | 2640 | 2320 | 2190 | 2240 |

[1] 62 wt % ethylene, 4 wt % ethylidene norbornene, Mooney Viscosity 60(ML1 + 4 125° C.)
[2] Trilene TM 66 (molecular weight of 8,000, 4.5 wt % ethylidene norbornene)
[3] Profax 6723
[4] Brominated methylol phenolic curing resin
[5] 40 wt % liquid EPDM and 60 wt % SP-1055

We claim:

1. A method for producing a thermoplastic elastomer comprising dynamically vulcanizing a mixture containing EPDM rubber and polyolefin resin, said elastomer having: (1) from about 14 to about 80 parts by weight of high molecular weight EPDM rubber per 100 parts by weight of polyolefin and total final rubber content, (2) from about 1 to about 30 parts by weight of liquid EPDM rubber per 100 parts by weight of polyolefin and total final rubber content, and (3) from about 85 to about 15 parts by weight polyolefin resin, said method comprising:
- (a) mixing together a phenolic curing resin of sufficient quantity to cure the rubber/polyolefin mixture to a thermoplastic elastomer and a portion of said liquid EPDM rubber to form a curing masterbatch;
- (b) mixing together said high molecular weight EPDM rubber and the balance of said liquid EPDM rubber;
- (c) adding said polyolefin resin to (b);
- (d) mixing the mixture of (c);
- (e) adding said masterbatch to (d);
- (f) mixing the mixture of (e);
- (g) adding a sufficient quantity of a cure accelerator to (f); and
- (h) dynamically vulcanizing the mixture of (g) until a thermoplastic elastomer is formed.

2. A method, as defined in claim 1, wherein: (1) said EPDM rubber is present in an amount of from about 23 to about 70 parts by weight of polyolefin and total final rubber content, (2) said low molecular weight ethylene/propylene/nonconjugated diene rubber is present in an amount of from about 2 to about 15 parts by weight of polyolefin and total final rubber content, and (3) said polyolefin is present in an amount of from about 75 to about 20 parts by weight of polyolefin and total final rubber content.

3. A method, as defined in claim 1, wherein said low molecular weight ethylene/propylene/nonconjugated diene rubber is liquid EPDM.

4. A method, as defined in claim 1, wherein said curing resin is a phenolic curing resin.

5. A method, as defined in claim 1, wherein said low molecular weight ethylene/propylene/nonconjugated diene rubber has a molecular weight in the range of from about 500 to about 20,000.

6. A method, as defined in claim 1, wherein said low molecular weight ethylene/propylene/nonconjugated diene rubber has a molecular weight in the range of from about 2,500 to about 10,000.

7. A method, as defined in claim 1, wherein said polyolefin is polypropylene.

8. A thermoplastic elastomer produced by the method of claim 1.

* * * * *